C. C. HECKATHORN.
GRASS RECEIVING ATTACHMENT FOR MOWERS.
APPLICATION FILED MAY 31, 1916.
1,281,002.
Patented Oct. 8, 1918.
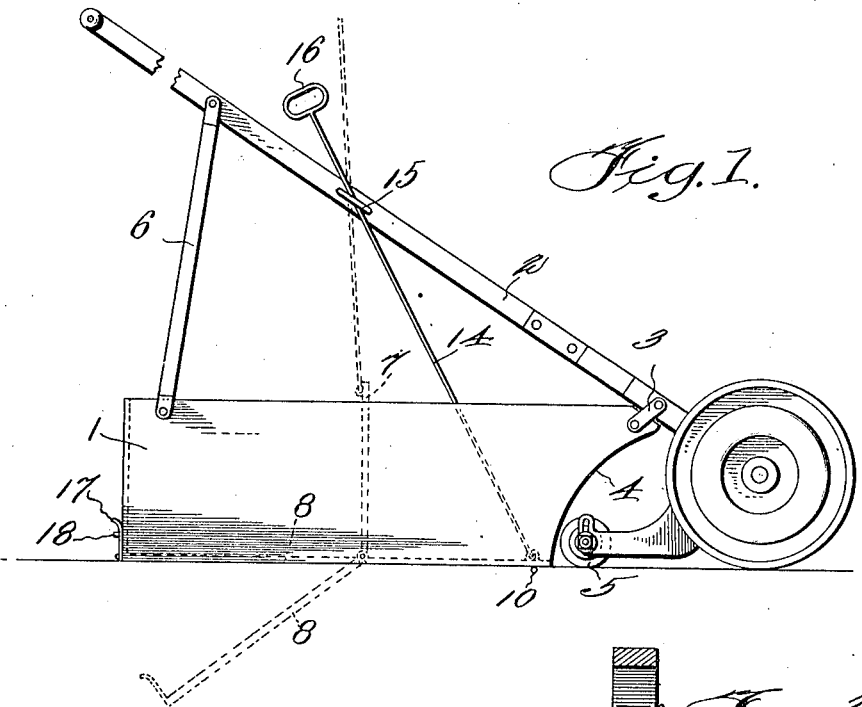
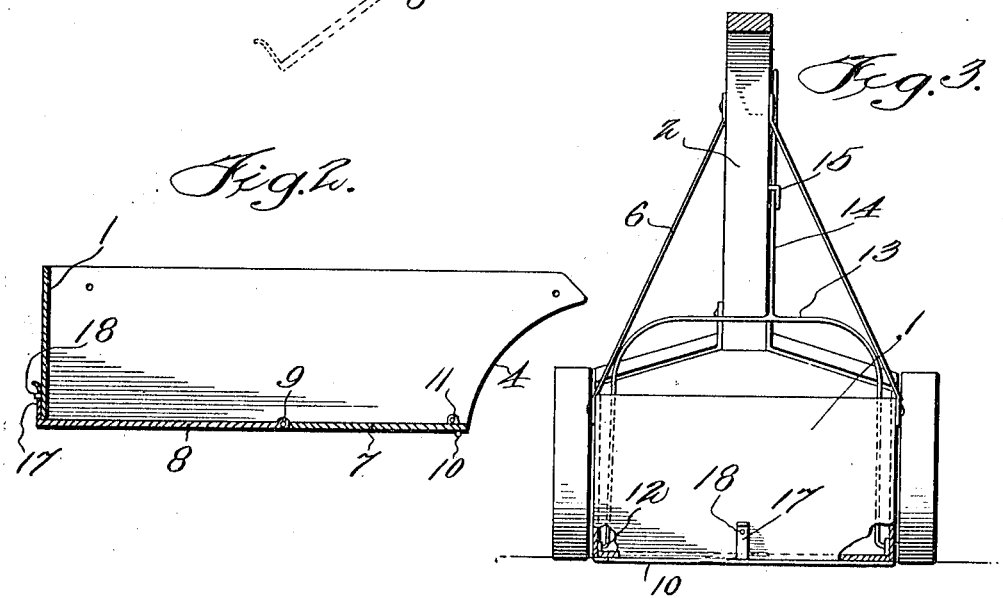
INVENTOR
Chester C. Heckathorn,
WITNESSES
BY
ATTORNEY

UNITED STATES PATENT OFFICE.

CHESTER C. HECKATHORN, OF SOUTH BEND, INDIANA.

GRASS-RECEIVING ATTACHMENT FOR MOWERS.

1,281,002.

Specification of Letters Patent.

Patented Oct. 8, 1918.

Application filed May 31, 1916. Serial No. 100,936.

*To all whom it may concern:*

Be it known that I, CHESTER C. HECKATHORN, a citizen of the United States, residing at South Bend, in the county of St. Joseph and State of Indiana, have invented certain new and useful Improvements in Grass-Receiving Attachments for Mowers, of which the following is a specification.

This invention relates to certain new and useful improvements in grass receiving attachment for mowers.

The primary object of this invention resides in the provision of a grass receiving attachment for mowers which will be of extremely simple construction and operation.

The invention has for another object the provision of a grass receiving attachment provided with a sectional hinged bottom, means being provided for swinging outwardly the forward section of such bottom to dump the contents of the receiver upon the rear section of said bottom, which latter may be readily released to permit dumping of the receiver.

A further object of the invention resides in the provision of a device of this character which may be readily attached to the handle of a lawn mower.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters designate corresponding parts throughout the several views:—

Figure 1 is a side elevation of the complete device attached to a lawn mower of conventional form, the movable parts being indicated by dotted lines.

Fig. 2 is a longitudinal vertical section through the device with parts removed.

Fig. 3 is a rear elevation of the device attached to a lawn mower as shown in Fig. 1, parts of the device being broken away in Fig. 3.

Referring more in detail to the drawing, 1 designates the body of the receiver which is in the form of a frame having an open forward end adapted to be connected with the lower portion of a lawn mower handle 2 by suitable connecting links, 3, portions of the front edges of the frame sides being cut away, as shown at 4 to avoid the roller 5 of the lawn mower, as will be readily understood by referring to Fig. 1 of the drawings.

Suspending rods 6 are connected at their lower ends to the rear portions of the frame sides, while their upper ends are brought inwardly and secured to the handle 2.

The frame is provided with a bottom formed of a forward section 7 and a rear section 8, said sections being hinged at their inner edges upon the transverse hinged pin 9 extended through the lower portions of the frame sides.

Downward movement of the forward bottom section 7 is limited by a rod 10 extended transversely beneath the forward edge of the same and carried by the sides of the frame 1. A pair of ears 11 are mounted upon the upper face of the forward bottom section 7 adjacent the forward corners thereof, and the lower outwardly turned extremities 12 of the arms 13 of the rod 14 are engaged in said ears 11. The rod 13 is engaged through a guide 15 mounted upon one side of the handle 2 and the upper end of said rod 14 is bent to form a handle 16 by means of which said rod 14 may be readily raised to swing the forward and bottom sections 7 upwardly and rearwardly and thereby throw all of the contents of the grass received onto the rear bottom section 8. The rear bottom section 8 is normally retained in closed or horizontal position by means of the spring latch member 17 engaged over the latch pin 18, the upper extremity of the latch member 17 being curved outwardly to enable the operator to readily force the same off from the latch pin 18 which as will be understood projects from the rear end of the frame 1.

During the use of the device, both bottom sections 7 and 8 are in horizontal position as clearly shown in Fig 2 of the drawings. When it is desired to dump the grass receiver, it is simply necessary to raise the lawn mower handle 2 and release the latch member 17, thereby permitting the rear bottom section 8 to spring downwardly as indicated by dotted lines in Fig. 1. As the handle 2 is again lowered, the rear bottom member 8 will engage the ground and be returned to closed position, the latch member 17 automatically locked upon the latch pin 18.

While the form of the invention herein shown and described is what is believed to be the preferred embodiment thereof, it is nevertheless to be understood that minor changes may be made without departing from the spirit and scope of the invention as claimed.

What I claim as new is:—

1. An attachment for lawn mowers including a receptacle having means to attach it to a mower and equipped with a sectional bottom consisting of a forward and a rearward section, said forward section being mounted to swing upwardly at times to move the contents of the receptacle toward the rear end thereof and said rearward section being mounted to swing downwardly at times to dump said contents from the receptacle.

2. An attachment for lawn mowers including a receptacle having means to attach it to a mower and equipped with a sectional bottom consisting of a forward and a rearward section, said forward section being mounted to swing upwardly at times to move the contents of the receptacle toward the rear end thereof and said rearward section being mounted to swing downwardly at times to dump the contents from the receptacle, and means for normally supporting the said sections in the same horizontal plane to close the bottom of the receptacle.

3. An attachment for lawn mowers, including a receptacle having means to attach it to a mower, said receptacle having its forward end open and being provided with a sectional bottom consisting of a forward and a rearward section hingedly connected together, means for normally holding the forward section against downward movement, a latch for normally holding the rear section against downward movement, ears formed on said forward section, and a rod having a forked end secured to said ears, said rod being so arranged as to raise the forward section at an angle to the rearward section.

4. An attachment for lawn mowers including a receptacle having means to attach it to a mower and equipped with a sectional bottom consisting of a forward and a rearward section, said forward section being mounted to swing upwardly at times to move the contents of the receptacle toward the rear end thereof, and said rearward section being mounted to swing downwardly at times to dump said contents from the receptacle, a bar positioned beneath said forward section to normally support the same in a horizontal position, and a releasable catch engageable with the rearward section to support the same in the same plane as the forward section.

In testimony whereof I affix my signature in presence of two witnesses.

CHESTER C. HECKATHORN.

Witnesses:
  LEON E. WOLFE,
  TONEY ELBERT.